Figure 1:
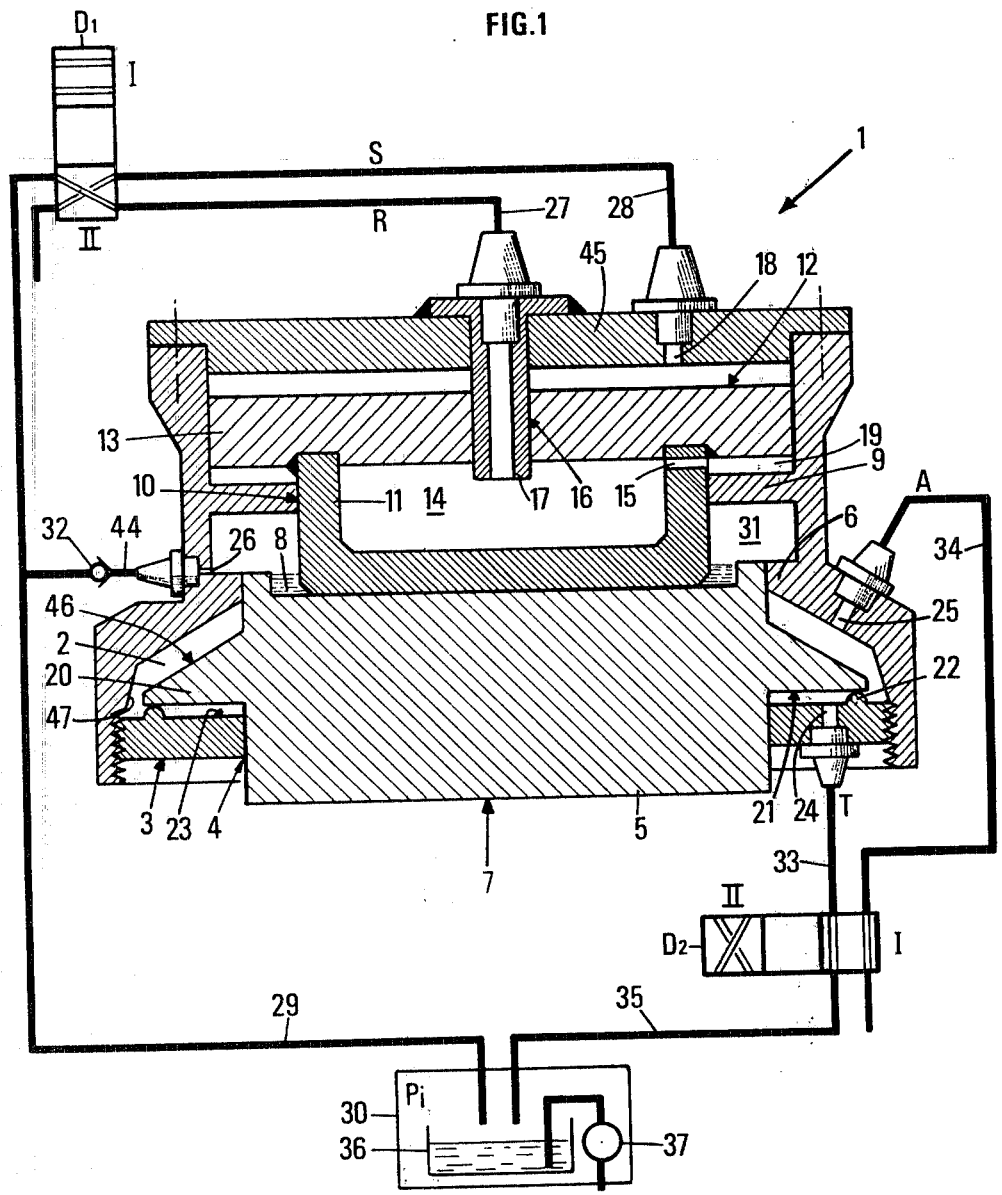

United States Patent [19]

Magneville

[11] 4,253,539
[45] Mar. 3, 1981

[54] DEVICE FOR GENERATING ACOUSTIC WAVES IN A FLUID BY IMPLOSION

[75] Inventor: Pierre Magneville, Vernouillet, France

[73] Assignee: Institut Francais du Petrole, Rueil-Malmaison, France

[21] Appl. No.: 9,027

[22] Filed: Feb. 2, 1979

[30] Foreign Application Priority Data

Feb. 3, 1978 [FR] France ............................... 78 03306

[51] Int. Cl.$^3$ ........................... G01V 1/38; G01V 1/14
[52] U.S. Cl. .................................. 181/120; 367/146; 91/165
[58] Field of Search ................ 367/146; 181/110, 115, 181/120; 92/84, 1–9; 91/44, 45, 165

[56] References Cited

U.S. PATENT DOCUMENTS

| Re. 26,748 | 12/1969 | Schempf | 367/146 |
| 3,564,492 | 2/1971 | Magneville et al. | 367/146 |
| 3,833,087 | 9/1974 | Cholet | 181/120 |
| 3,997,022 | 12/1976 | Cholet | 181/119 |

Primary Examiner—Nelson Moskowitz
Attorney, Agent, or Firm—Millen and White

[57] ABSTRACT

Device for generating acoustic waves by implosion in a fluid medium comprising fluid-operated means to move a piston, having one end face in contact with said fluid, from a retracted position in the enclosure to a spaced apart position of maximum extension towards the exterior of the enclosure or vice versa and intermittent locking means for maintaining the piston at its spaced apart position, said fluid-operated means being actuated by two sources of fluid at different pressures, one of which is said fluid medium and the other a source of lower pressure.

13 Claims, 5 Drawing Figures

DEVICE FOR GENERATING ACOUSTIC WAVES IN A FLUID BY IMPLOSION

This invention relates to a device for generating acoustic waves in a fluid by implosion. It is particularly well adapted to generate seismic waves for underwater seismic prospection.

It is already known to generate acoustic waves by implosion in a fluid by means of a device comprising a cylinder and a piston having a wall in permanent contact with the fluid. The piston is adapted to slide into the cylinder, while insulating the interior thereof from a liquid medium, from a position of maximum penetration into the cylinder (retracted position) to a position of maximum outward extension therefrom (spaced apart position). It also comprises a moving member adapted to intermittently contact the piston to displace it up to the spaced apart position. Pressure means are used to apply unequal pressures on the two opposite walls of the moving member. Moreover, intermittent locking means are used to lock the piston at its the spaced apart position. The pressure means consists of a hydraulic system comprising a high pressure oil source, a low pressure oil receptacle and an oil distributor for creating a pressure difference between the two sides of the moving member so as to make it slide in such a direction that it drives the piston towards the exterior of the cylinder and then in the opposite direction to retract it when the piston is maintained in its spaced apart position. Such a device is described in U.S. Pat. No. 3,997,022. The device requires the use of powerful motor means for generating a pressurized fluid at a pressure which is the higher as it is operated at a greater depth at which the hydrostatic pressure opposing the displacement of the piston towards its spaced apart position is the greater. The motor means are preferably located on a surface ship, the pressurized oil feeding pipes having possibly a very great length, particularly when the transmission device is towed while submerged at a relatively great distance from the ship.

The device of the present invention makes it possible to avoid the use of motor means for generating a pressurized fluid and also the need of feeding pipes of great length.

It is note-worthy in that the surface area of at least one of the two opposite walls of the movable member is greater than that of the piston wall in permanent contact with the fluid and in that the pressure means comprises at least two fluid sources at different pressures, the pressure of the first fluid source being that of the surrounding fluid and the pressure of the second source being lower than that of the first source.

The intermittent locking means comprises a fluid control system for applying unequal pressures on valve means integral with the piston. The pressure means and the fluid control system comprise a first pressure source consisting either of the surrounding fluid or of an auxiliary fluid in pressure equilibrium therewith or the combination of both, and a second pressure source constituted by a reservoir wherein prevails a pressure lower than that of the surrounding fluid or the auxiliary fluid.

With this arrangement, the pressure means may be located in the vicinity of the device, irrespective of its submersion depth or its distance from a towing ship.

Figure 2:
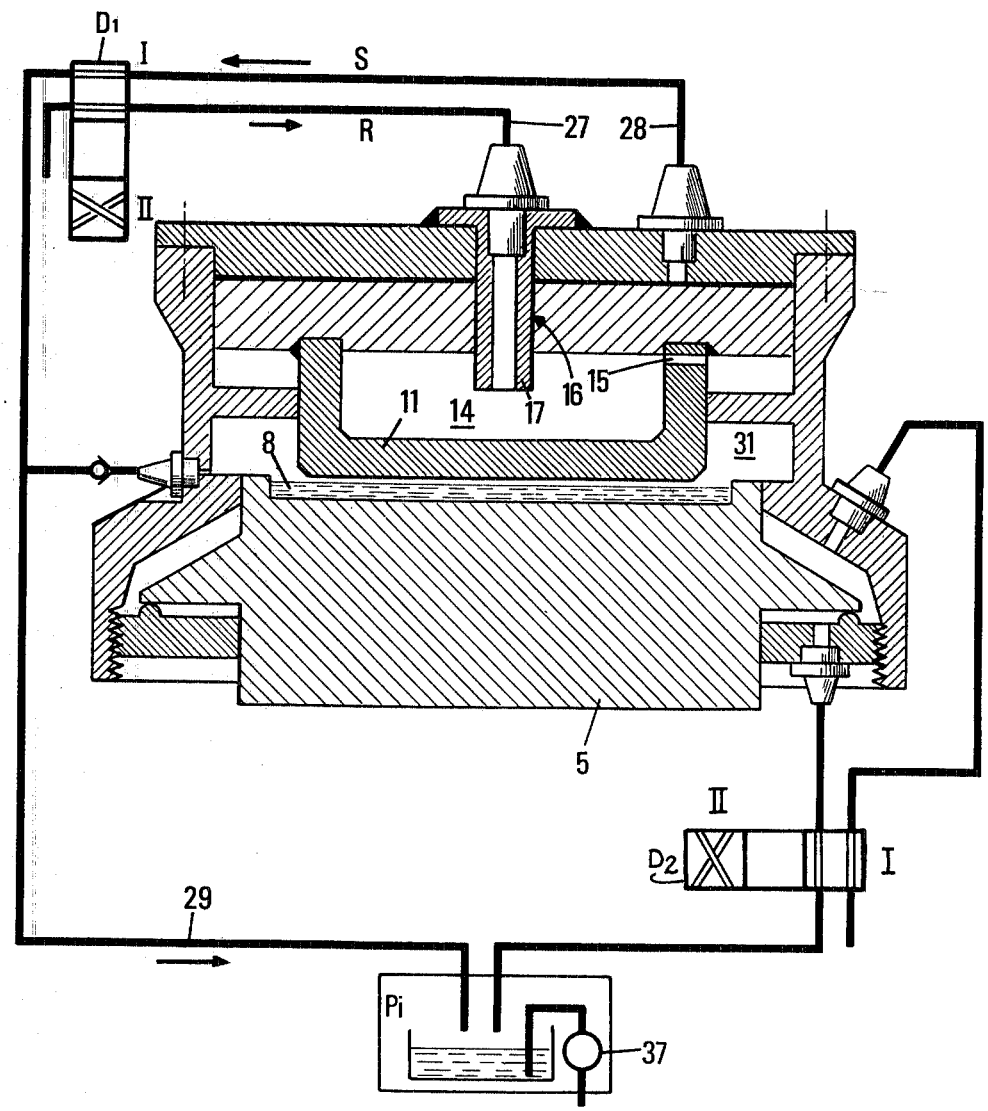
Figure 3:
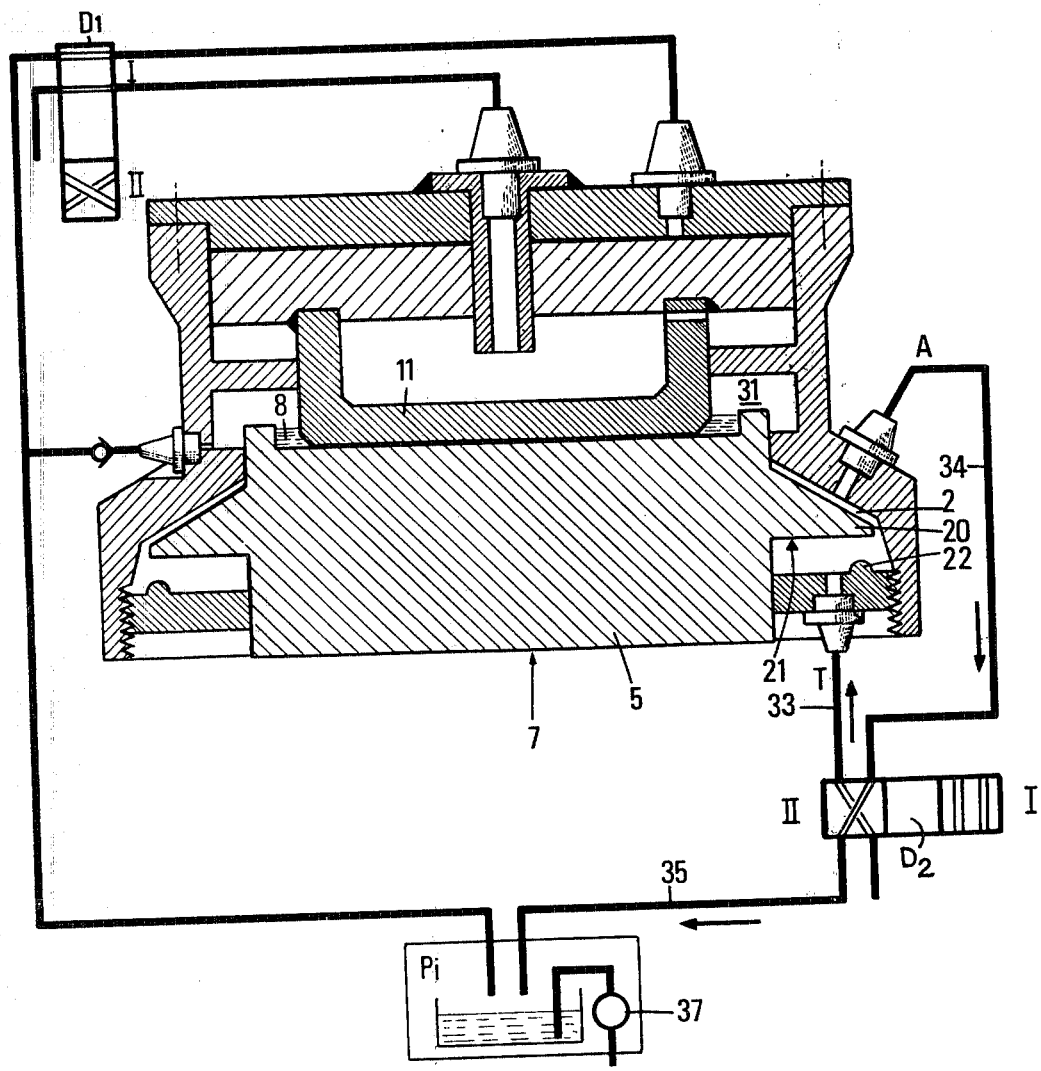
Figure 4:
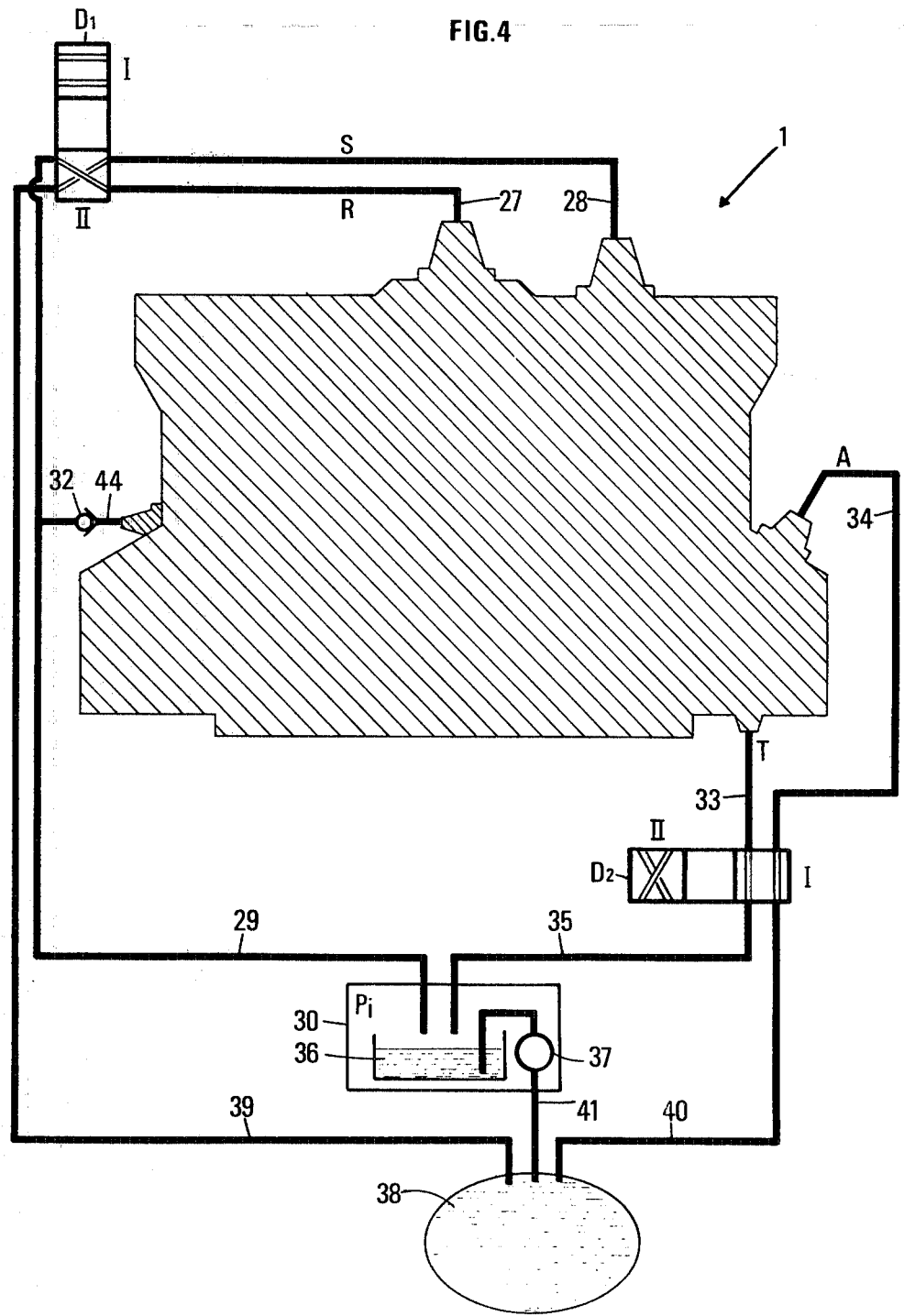
Figure 5:
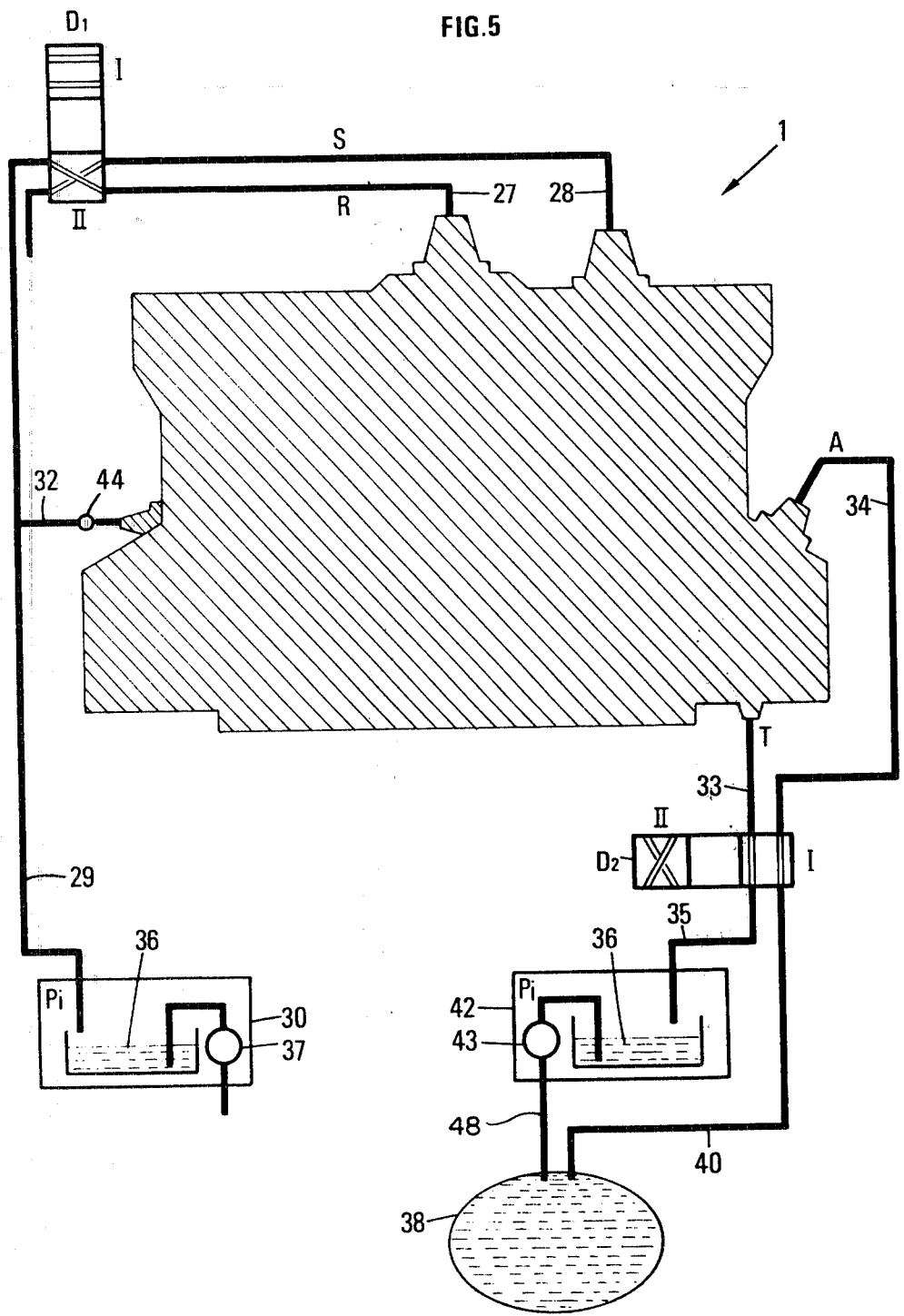

Other characteristics and advantages will be made apparent from the following description of non-limitative embodiments of the invention, given with reference to the accompanying drawings wherein:

FIG. 1 shows the first embodiment of the device, entirely operable by using the external medium as fluid, the piston being driven to its spaced apart position by the moving member, FIG. 2 shows the first embodiment of the device, wherein the piston is shown in its spaced apart position and the moving member is brought back to its upper retracted position, FIG. 3 shows the first embodiment of the device wherein the piston has been released and is again in retracted position, FIG. 4 diagrammatically shows the pressure means and the hydraulic system in case of use of an auxiliary fluid, in pressure equilibrium with the external fluid, FIG. 5 diagrammatically shows the pressure means and the hydraulic system, in case of the combined use of external fluid and auxiliary fluid in pressure equilibrium with said external fluid.

The device comprises (FIGS. 1, 2 and 3) an enclosure 1 provided with a first chamber or recess 2. A plate 3, provided with an opening 4, is fixed to the wall of the enclosure. Preferably, the plate 3 is screwed into the wall of the enclosure and may thus be adjustably positioned. Through the opening 4 of plate 3 may slide, substantially tightly, a piston 5, also permanently guided through an opening of an internal partition 6 of enclosure 1. Piston 5 comprises a terminal wall 7 subjected to the pressure of the external medium. A second end wall 8, opposite to wall 7, comprises preferably a recess which is filled with water, at least partially.

The enclosure also comprises a second partition 9, more remote than the first partition 6 from the plate 3, and provided with an opening 10 through which may slide, substantially tightly, a protruding element 11 of a moving member or push-member 12. The latter is provided with a head 13 having a diameter larger than that of the protruding element 11 and a surface area larger than the surface area of the wall 7 of the piston in contact with the external medium. The head 13 of the push-member may slide substantially tightly in a second cylindrical chamber 19 delimited by the external wall of enclosure 1 and by the internal partition 9. The push-member comprises an inner cavity 14. A channel 15 is provided through the wall of the protruding element 11 of the push-member and establishes communication between cavity 14 and the chamber part 19 between the head 13 and the partition 9. An opening 16 is also provided through the head 13 of the push-member. A tube 17, integral with the terminal wall 45 of the enclosure slides tightly in the opening 16 and opens into cavity 14 of the protruding element 11.

An opening 18 is also provided through the external wall 45 of chamber 19.

The piston part internal to the first chamber or cavity 2 is integral, at its periphery, with a valve 20 comprising a first contact wall 21 facing plate 3 and a second wall 46 opposite to the first one, its surface area being larger than that of the end wall 7 of the piston which is permanently in contact with the external medium. The plate 3 comprises an annular seat 22 of a diameter smaller than that of the external edge of valve 20 and delimiting an internal recess 23. A hole 24 is perforated through plate 3 and opens into the inner recess 23. An opening 25 is also arranged in the external wall of cavity 2 facing the wall 46 of valve 20. In addition, a channel 26 passes through the wall of the enclosure and opens inside a third chamber or cavity 31 delimited by the partitions 6 and 9, the protruding element 11 of the push-member and the terminal wall 8 of the piston. The sizes of the different parts of the device are such that the displacement of the push-member is at least equal to the maximum stroke of the piston, irrespective of the selected position of plate 3 with respect to the wall of the first chamber. On the other hand, the push-member is so arranged that, on at least one portion of its stroke, it comes in abutment against the wall 8 of the piston and drives it in translation to its spaced apart position.

The lateral wall of the first chamber 2 may comprise, towards its end opposite to plate 3, a narrow part 47 producing a pressure drop and a laminating of the fluid. The piston is thus progressively braked in the vicinity of its retracted position.

The pressure means used to actuate the push-member comprises two lines 27 and 28 connected at one end thereof respectively to the outlets of a distributor D1 and at their second end respectively to the inlet of tube 17 and to the opening 18. An inlet of distributor D1 is open to the external medium. The other is connected through a line 29 to a closed reservoir 30, isolated from the external medium, where prevails a pressure lower than that of the external medium. Cavity 31 communicates with reservoir 30 through a draining system comprising a pipe 44 connected, on the one hand, to channel 26 and, on the other hand, to line 29 through a check valve 32. The excess of liquid contained in cavity 31, which might infiltrate from the vicinal cavity of the enclosure, may thus be drained towards the low pressure reservoir 30.

The distributor D1 is for example a two-way slide distributor. In position I, it establishes communication of lines 27 and 28 respectively with the external fluid and with reservoir 30. In position II, conversely, it establishes communication of channels 27 and 28 respectively with reservoir 30 and with the external medium.

The locking means of piston 5 comprises a fluid control system. The latter comprises two pipes 33 and 34 connected, through a first end thereof, respectively with openings 24 and 25 on both sides of the valve 20 and, through a second end, respectively to the two outputs of a second two-way distributor D2. A first input of distributor D2 is open to the external medium. A second input communicates, through a pipe 35, with the low pressure reservoir 30. Distributor D2 is, for example, identical to distributor D1. In a first position (I), it establishes communication of pipes 33 and 34 respectively with reservoir 30 and with the external medium. In a second position (II) it reverses the direction of the connections and establishes communication of pipes 33 and 34 respectively with the external medium and with the low pressure reservoir 30.

Pipes 29 and 35 open into the low pressure reservoir 30 and discharge into a vessel 36 the external fluid conveyed through distributors D1 and D2. A pump 37 sucks the fluid at the lower pressure contained in vessel 36 and discharges it to the external medium.

In the recess of wall 8 there can be arranged a cushion (not shown) made of elastic material whose damping effect will be added to that of the water layer contained therein.

The device is operated in the following manner:

The piston 5 and the push-member being both in retracted position (FIG. 3), distributor D1 is operated to position II. There is thus created a pressure difference between the two opposite faces of the push-member in such a direction that its protruding element 11 comes in abutment against piston 5 and drives it in translation, up to a position where the face 21 of valve 20 abuts against the seat 22 and where piston 5 is at its spaced apart position (FIG. 1). The distributor D2 is then actuated to position I. The pressure difference between the two opposite walls of the valve has the effect of maintaining piston 5 at its spaced apart position.

The distributor D1 is again actuated and placed to position I, which has the effect of establishing between the opposite faces of the push-member a pressure difference which tends to drive it away from piston 5, always in locking position, towards its retracted position (FIG. 2). The device is ready for being triggered. A direction reversal of distributor D2 (position II) has the effect of releasing the piston which abruptly penetrates the cylinder by the effect of the pressure difference between the pressure of the external medium and the lower pressure prevailing in chamber 31 (FIG. 3). At the end of the stroke, the piston 5 is braked by the water layer contained in the recess of surface 8 and/or by the layer of elastic material arranged therein.

In the embodiment of FIG. 4 the high pressure fluid source no longer consists directly of the surrounding medium but of a deformable reservoir 38 subjected to the pressure of the surrounding medium and containing an auxiliary fluid, oil for example. This fluid source of higher pressure is connected to distributors D1 and D2 through pipes 39 and 40.

Pump 37, arranged in reservoir 30, discharges the fluid at lower pressure from vessel 36 to the deformable reservoir 38 through pipe 41.

In the embodiment of FIG. 5, the pressure means and the fluid control system are mixed. The inlets of distributor D1 communicate respectively with reservoir 30 through pipe 29 and with the external medium. On the contrary, the inlets of the distributor D2 communicate respectively with a deformable reservoir 38 containing a fluid in pressure equilibrium with the external medium and with a low pressure reservoir 42. The latter also comprises a pump 43 to discharge the low pressure auxiliary fluid issued from distributor D2 towards the deformable reservoir at higher pressure through pipe 48.

The operation of the device according to the embodiments of FIGS. 4 and 5 is identical to that described above since the only change consists in the nature of the motive fluid and/or the auxiliary fluid used for locking the valve.

The device may be operated alone or in combination with other identical devices. The carrying vehicle may for example be towed, when immersed, from a surface ship. Reservoirs 30, 38 and 42 depending on the case, will then be incorporated into the vehicle.

I claim:

1. In a device for generating acoustic waves in a fluid medium by implosion, comprising an enclosure provided with a first chamber and a second chamber, a piston having a first end wall in permanent contact with the surrounding fluid and adapted to slide in the first chamber of the enclosure between a retracted position in the enclosure and a spaced apart position of maximum extension towards the exterior, said piston permanently isolating the inside of the enclosure from the surrounding fluid, a displaceable moving member adapted to contact the piston intermittently and to drive the piston to its spaced apart position, pressure means for applying unequal pressures on two opposite walls of the movable member and intermittent releasable locking means for maintaining the piston at its spaced apart position, the improvement wherein the surface area of at least the wall of the movable member which is remote from the piston is greater than that of the first end wall of the piston in permanent contact with the surrounding fluid, and wherein the pressure means comprises at least two sources of different pressures, the pressure of the first source being that of the surrounding fluid and the pressure of the second source being lower than that of the first source.

2. A device according to claim 1, wherein the intermittent locking means comprises a fluid control system for applying unequal pressures on a valve integral with the piston and having a first wall remote from the first end wall of the piston, the surface area of the first wall of the valve being greater than that of the first end wall of the piston.

3. A device according to claim 2, wherein the pressure means and the fluid control system comprise a first pressure source consisting of the surrounding fluid.

4. A device according to claim 2, wherein the pressure means and the fluid control system comprise a first pressure source consisting of an auxiliary fluid contained in a vessel, said auxiliary fluid being in pressure equilibrium with the surrounding fluid.

5. A device according to claim 2, wherein the pressure means comprises a first pressure source consisting of the surrounding fluid and the fluid control system comprises a vessel containing an auxiliary fluid in pressure equilibrium with the surrounding fluid.

6. A device according to claim 1 wherein the pressure means and the fluid control system each comprise at least one second pressure source including a reservoir isolated from the surrounding fluid, the pressure in the reservoir being lower than that of the surrounding fluid.

7. A device according to claim 6, wherein the movable member is displaceable in the second chamber of the enclosure; the valve integral with the piston is adapted to be displaced in the first chamber of the enclosure and comprises a second wall adapted to rest on a seat placed on the inner end wall of the enclosure traversed by said piston when the piston is in the spaced apart position; wherein the pressure means comprises a first distribution means for establishing communication between a first part of the second chamber on one side of the movable member alternatively with one of the first pressure source and the second pressure source, said first distribution means also establishing communication between a second part of the second chamber on the opposite side of the movable member alternatively with the other of the first pressure source and the second pressure source; and wherein the fluid control system comprises a second distribution means for establishing communication between a first part of the first chamber of the enclosure on one side of the valve alternatively with one of the first pressure source and the reservoir, said second distribution means also establishing communication between a second part of the first chamber on the opposite side of the valve alternatively with the other of the first pressure source and the reservoir.

8. A device according to claim 1 wherein the enclosure comprises a third chamber substantially isolated from the first and second chambers and communicating with the second source through effluent conduit means; and wherein the movable member comprises a protruding element adapted to abut intermittently against a second end wall of the piston on the opposite end from the end wall in contact with the surrounding medium, the wall of a part of the protruding element and the second end wall of the piston being permanently in the third chamber.

9. A device according to claim 8, wherein the second end wall of the piston further comprises a recess adapted to contain a deformable substance to dampen the shock between the piston and the movable member.

10. A device according to claim 1, wherein the enclosure further comprises means for varying the length of the piston stroke between its spaced apart position and its retracted position.

11. A device according to claim 1, which further comprises means for braking the rapid piston movement from its spaced apart position to its retracted position and in the vicinity thereof by lamination of fluid contained in the first chamber.

12. A device according to claim 2, wherein the pressure means and the fluid control system each comprise a first pressure source consisting of the surrounding fluid or an auxiliary fluid contained in a vessel, said auxiliary fluid being in pressure equilibrium with the surrounding fluid.

13. A device according to claim 8, wherein the effluent conduit means further comprises a check valve to prevent fluid from flowing back into the third chamber.

* * * * *

UNITED STATES PATENT AND TRADEMARK OFFICE
CERTIFICATE OF CORRECTION

PATENT NO. : 4,253,539
DATED : March 3, 1981
INVENTOR(S) : PIERRE MAGNEVILLE

It is certified that error appears in the above—identified patent and that said Letters Patent is hereby corrected as shown below:

COLUMN 5, line 23: reads: "sure means and the fluid control system comprise a first"

should read: --sure means and the fluid control system each comprise a first--.

COLUMN 5, line 26: reads: "sure means and the fluid control system comprise a first"
should read: --sure means and the fluid control system each comprise a first--.

COLUMN 5, line 35: reads: "6. A device according to claim 1 wherein the pressure"
should read: --6. A device according to claim 12 wherein the pressure--.

Signed and Sealed this

Second Day of June 1981

[SEAL]

Attest:

RENE D. TEGTMEYER

Attesting Officer  Acting Commissioner of Patents and Trademarks